Nov. 6, 1923.　　　　　　　　　　　　　　　　　1,472,859
A. VASSELLI
TIME ANNOUNCING PHONOGRAPH
Filed July 28, 1920　　　　10 Sheets-Sheet 1
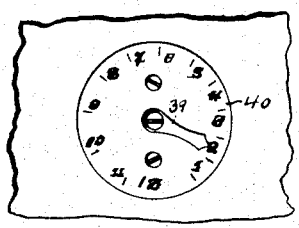
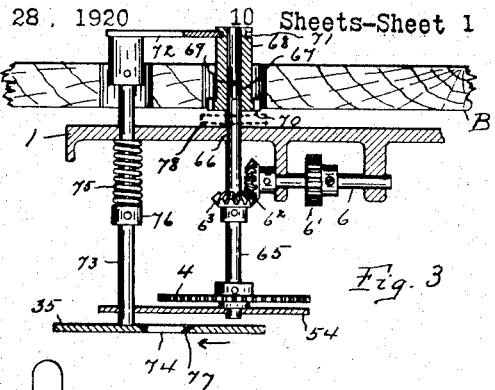
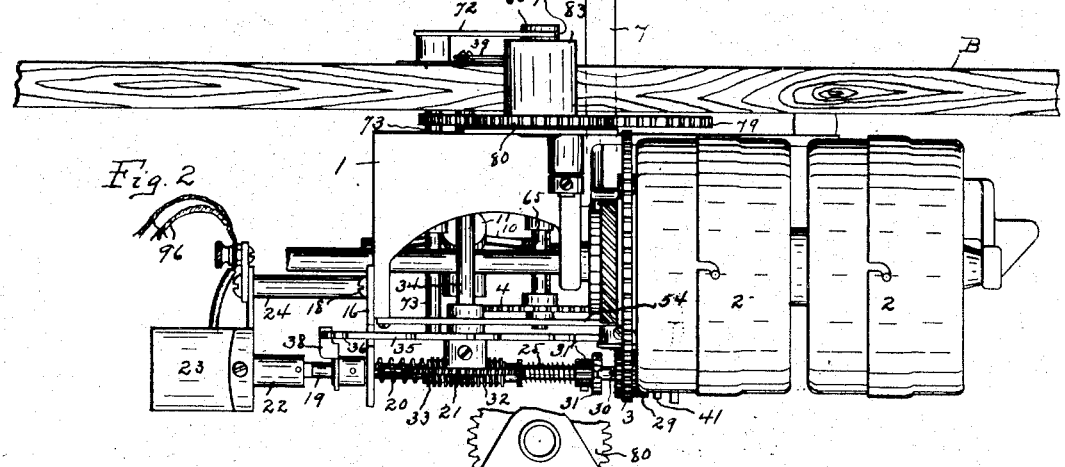
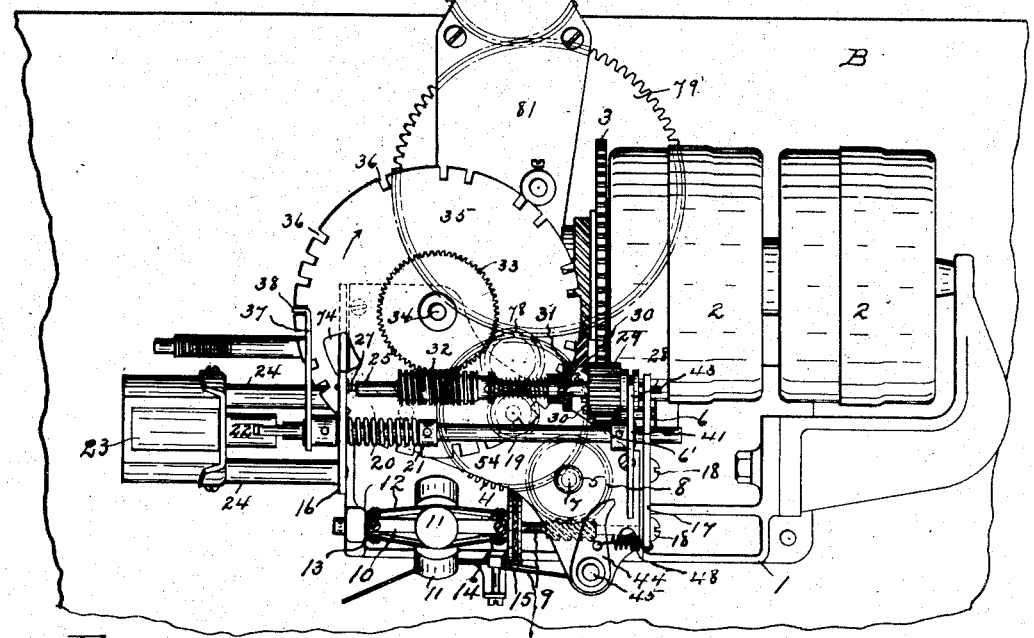
A. Vasselli INVENTOR.
Louis M. Sanders ATTORNEY.

Nov. 6, 1923.
A. VASSELLI
1,472,859
TIME ANNOUNCING PHONOGRAPH
Filed July 28, 1920     10 Sheets-Sheet 2
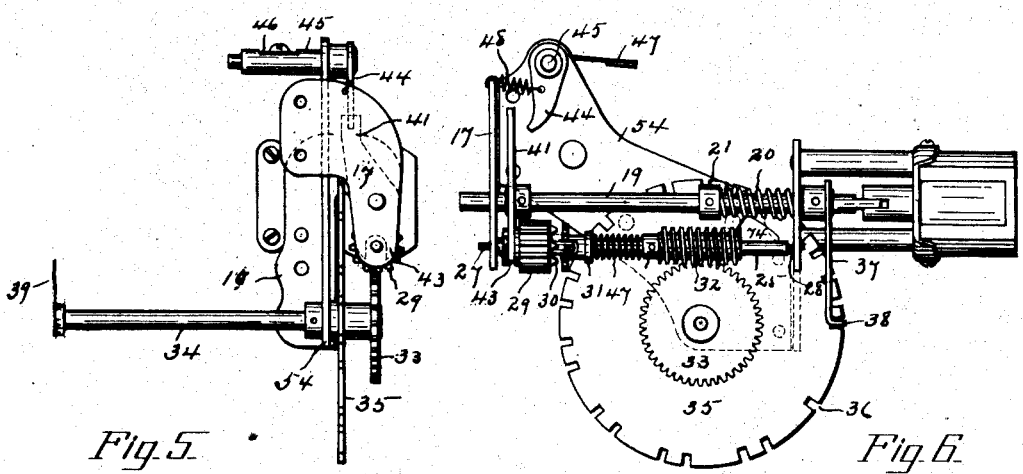
Fig. 5.     Fig. 6.
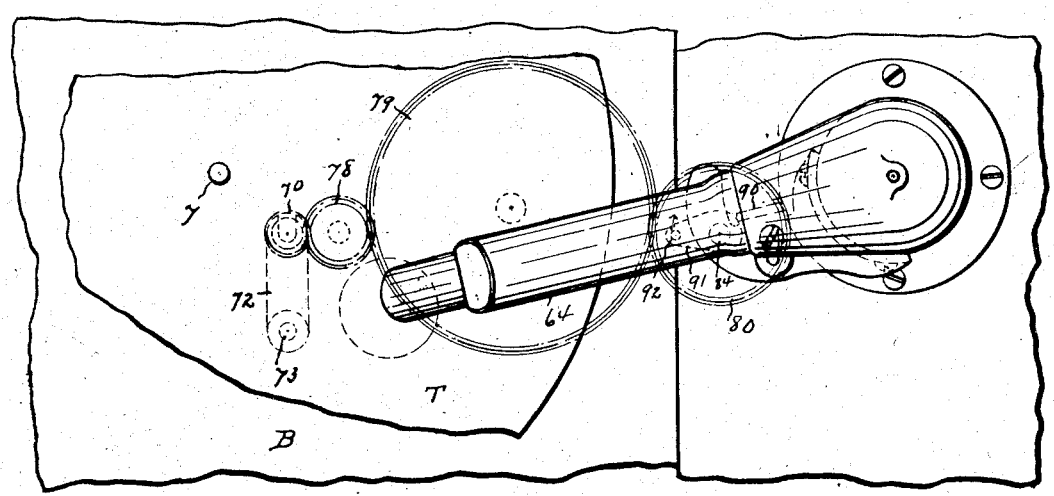
Fig. 7.
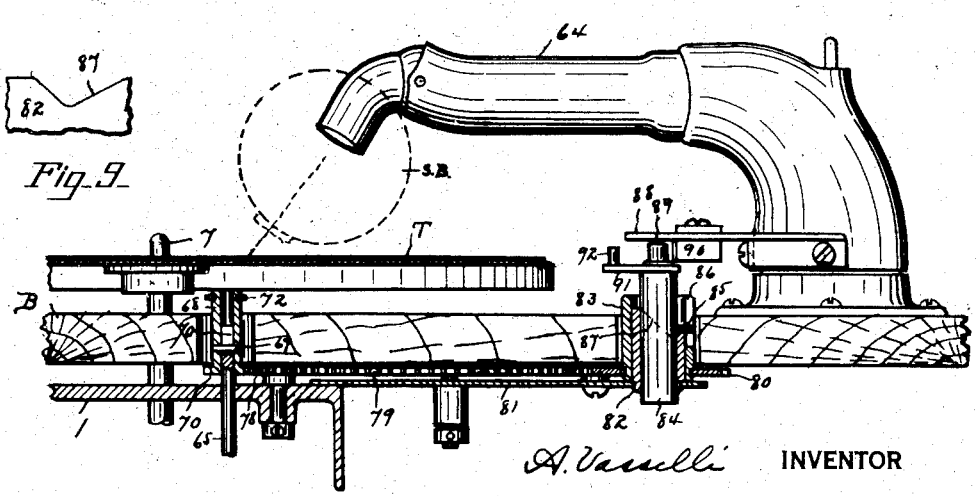
Fig. 9.
Fig. 8.
A. Vasselli     INVENTOR
BY
Louis M. Sanders ATTORNEY Nov. 6, 1923.  
A. VASSELLI  
1,472,859

TIME ANNOUNCING PHONOGRAPH

Filed July 28, 1920   10 Sheets-Sheet 3

A. Vasselli  
INVENTOR

BY Louis M. Sanders  
ATTORNEY

Nov. 6, 1923.

A. VASSELLI 1,472,859

TIME ANNOUNCING PHONOGRAPH

Filed July 28, 1920    10 Sheets-Sheet 4

A. Vasulli INVENTOR

BY

Louis M. Sanders ATTORNEY

Nov. 6, 1923.  
A. VASSELLI  
1,472,859  
TIME ANNOUNCING PHONOGRAPH  
Filed July 28, 1920    10 Sheets-Sheet 5

Nov. 6, 1923.　　　　　　　　　　　　　　　　　1,472,859
A. VASSELLI
TIME ANNOUNCING PHONOGRAPH
Filed July 28, 1920　　　10 Sheets-Sheet 6

A. Vasselli INVENTOR

BY

Louis M. Sanders ATTORNEY

Nov. 6, 1923.

A. VASSELLI 1,472,859

TIME ANNOUNCING PHONOGRAPH

Filed July 28, 1920    10 Sheets-Sheet 7

A. Vasselli INVENTOR

BY

Louis M. Sanders ATTORNEY

Nov. 6, 1923.

A. VASSELLI 1,472,859

TIME ANNOUNCING PHONOGRAPH

Filed July 28, 1920    10 Sheets-Sheet 8

| 12" Record | | | | |
|---|---|---|---|---|
| Time | Speech Turns | Pick Up Turns | Break Turns | Seconds |
|  |  |  | 5 | 3.75 |
| 1 | 2 | 5 | 5 | 9 |
| 1.30 | 2 | 5 | 5 | 9 |
| 2 | 3 | 5 | 5 | 9.75 |
| 2.30 | 2 | 5 | 5 | 9 |
| 3 | 4 | 5 | 5 | 10.50 |
| 3.30 | 2 | 5 | 5 | 9 |
| 4 | 6 | 5 | 5 | 12 |
| 4.30 | 2 | 5 | 5 | 9 |
| 5 | 7 | 5 | 5 | 12.75 |
| 5.30 | 2 | 5 | 5 | 9 |
| 6 | 8 | 5 | 5 | 13.50 |
| 6.30 | 2 | 5 | 5 | 9 |
| 7 | 8 | 6 | 6 | 15 |
| 7.30 | 2 | 5 | 5 | 9 |
| 8 | 9 | 6 | 6 | 15.75 |
| 8.30 | 2 | 5 | 5 | 9 |
| 9 | 10 | 7 | 7 | 18 |
| 9.30 | 2 | 5 | 5 | 9 |
| 10 | 11 | 7 | 7 | 18.75 |
| 10.30 | 2 | 5 | 5 | 9 |
| 11 | 12 | 7 | 7 | 19.50 |
| 11.30 | 2 | 5 | 5 | 9 |
| 12 | 12 | 8 | 8 | 21 |
| 12.30 | 2 | 5 |  | 5.25 |
| Total | 116 | 131 | 131 | 283.50 |
| Turns Of Table For Arm Replacement |  |  | 22 |  |
| Seconds For Arm Replacement |  |  |  | 16.50 |
| Total Turns |  |  | 400 |  |
| Total Seconds |  |  |  | 300.00 |

Fig.19

A. Vasselli

INVENTOR

BY

Louis M. Sanders

ATTORNEY

Nov. 6, 1923.
A. VASSELLI
1,472,859
TIME ANNOUNCING PHONOGRAPH
Filed July 28, 1920     10 Sheets-Sheet 10
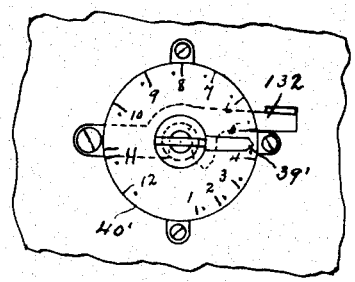
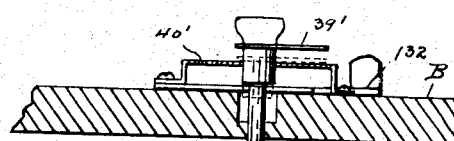
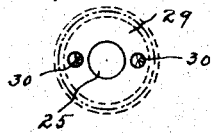
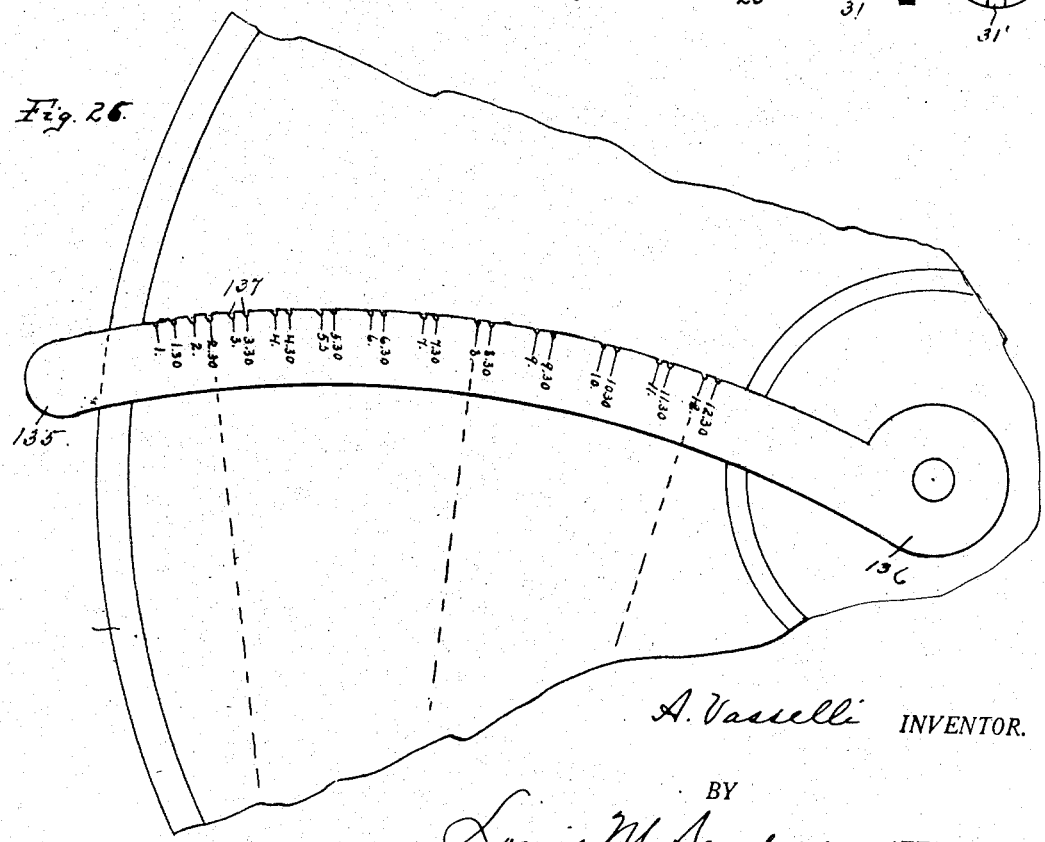
A. Vasselli INVENTOR.
BY
Louis M. Sanders ATTORNEYS.

Patented Nov. 6, 1923.

1,472,859

UNITED STATES PATENT OFFICE.

ANTHONY VASSELLI, OF NEWARK, NEW JERSEY.

TIME-ANNOUNCING PHONOGRAPH.

Application filed July 28, 1920. Serial No. 399,533.

*To all whom it may concern:*

Be it known that I, ANTHONY VASSELLI, a citizen of the United States, residing in the city of Newark, county of Essex, and State of New Jersey, have invented a new and useful Improvement in Time-Announcing Phonographs, of which the following is a specification.

My invention relates to mechanism designed to so interconnect a phonograph motor and a modified form of striking clock that the hour and half hour may be announced by the phonograph in actual words, as by counting the numbers representing the hours and announcing the half hour, for example:—"three thirty", "five thirty", "eight thirty", etc.

The invention also contemplates mechanism for shifting the tone arm and sound box of the phonograph from final position to initial position, as for example when the last half hour, namely "twelve thirty", has been announced. It also contemplates the use of a specially formed record upon which the hours and half hours have been impressed at suitable intervals upon the record surface so that the entire record surface may be utilized in announcing the time during the period of twelve hours.

I also provide mechanism for resetting both the time wheel or disc to correspond with the clock time, and also for resetting the sound box needle in its proper location upon the time announcing record.

In carrying out my invention I have illustrated the same in connection with a well known form of phonograph spring motor. I have also shown both mechanical and electrical means for starting the announcing mechanism, such means being initially actuated by the modified striking part of a clock.

In the accompanying drawings:

Fig. 1, is an inverted plan view of a well known form of spring motor with my improved timing mechanism engrafted thereon.

Fig. 2, is a rear elevation of the same.

Fig. 3, illustrates a detail of my improvement.

Fig. 4, is a plan view of the plain setting dial.

Figs. 5 and 6, are respectively end and bottom plan views of my improvement completely detached from the spring motor.

Fig. 7, is a fragmentary plan view of a phonograph top showing the tone arm and the gear train outlined for shifting the tone arm from final to initial or starting position.

Fig. 8, is a sectional view of the same.

Fig. 9, is a rectified plan of the cam mechanism for elevating the tone arm during the shifting movement.

Figure 10:
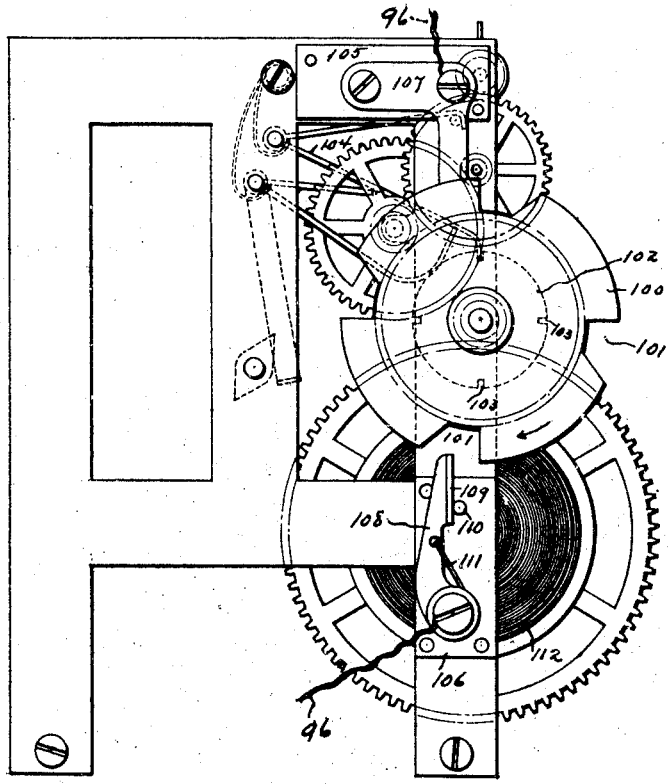
Figure 11:
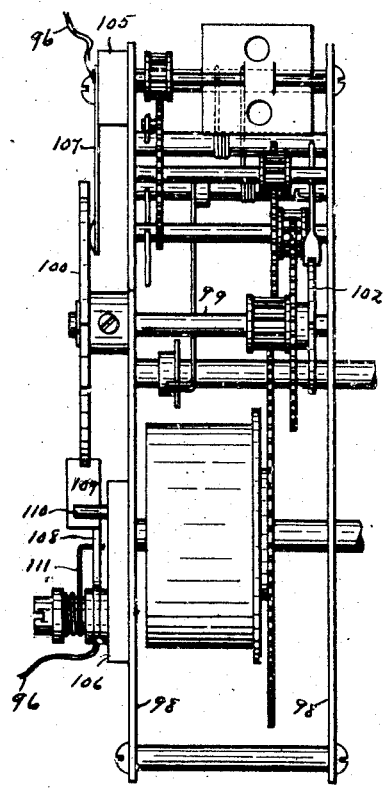

Figs. 10, and 11, respectively illustrate the rear and side elevations of so much of the striking train of a clock movement as is necessary to understand the operation of my improvement.

Figure 12:
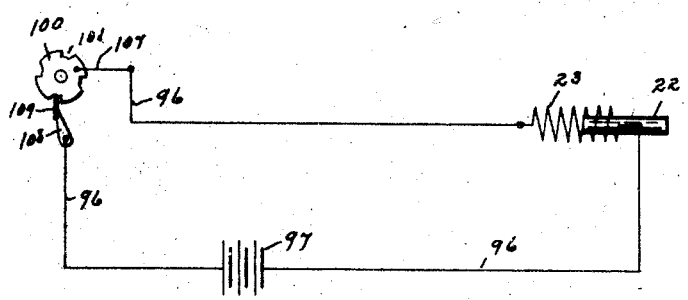

Fig. 12, is a wiring diagram illustrating the electrical connections for tripping off the time announcing mechanism connected with the motor.

Figure 13:
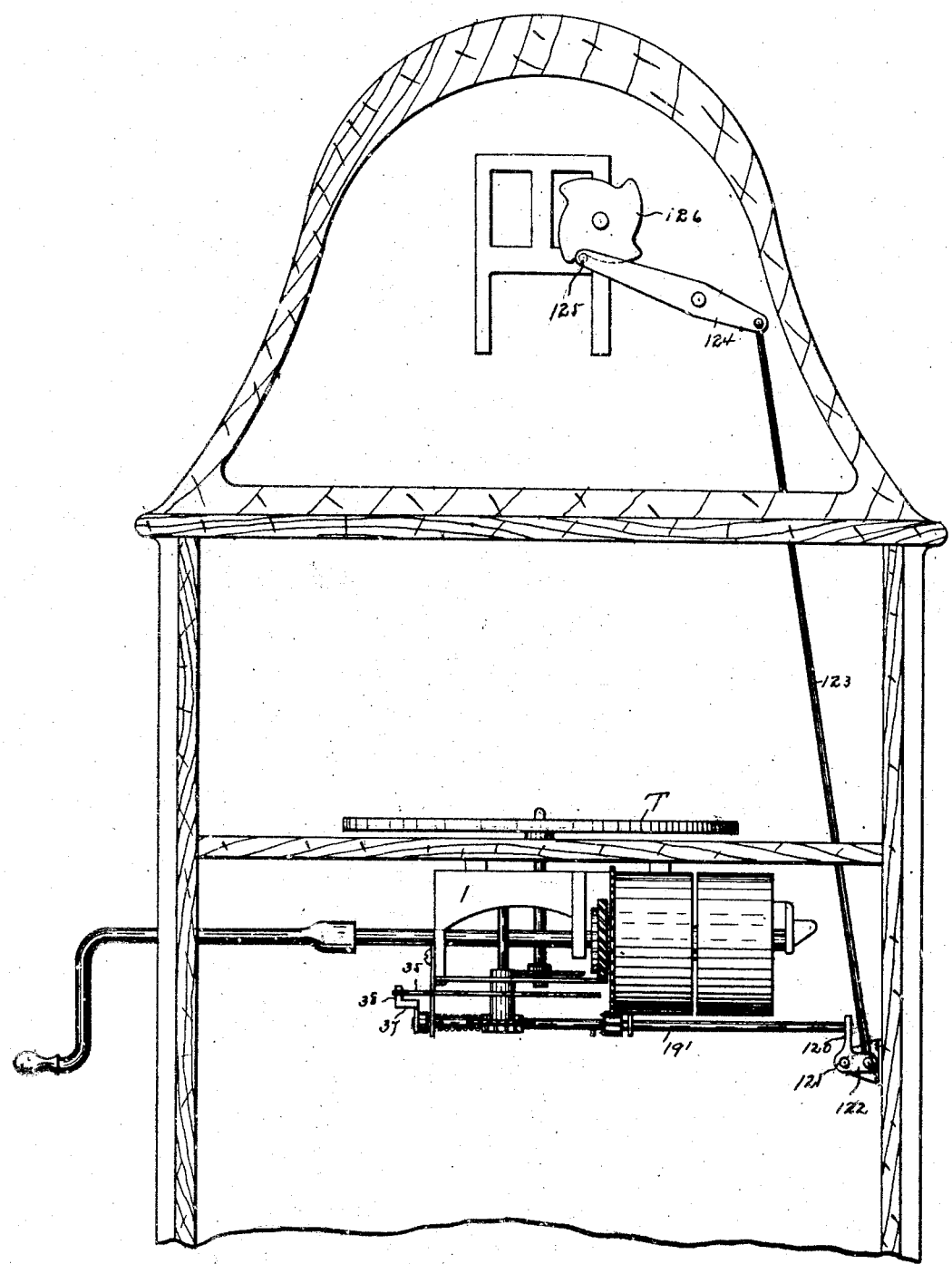

Fig. 13, is a sectional view of the rear side of a phonograph cabinet showing the location of the clock mechanism, the motor board, the motor, and the mechanical connections between the clock and the motor for operating the time announcing mechanism mechanically.

Figure 14:
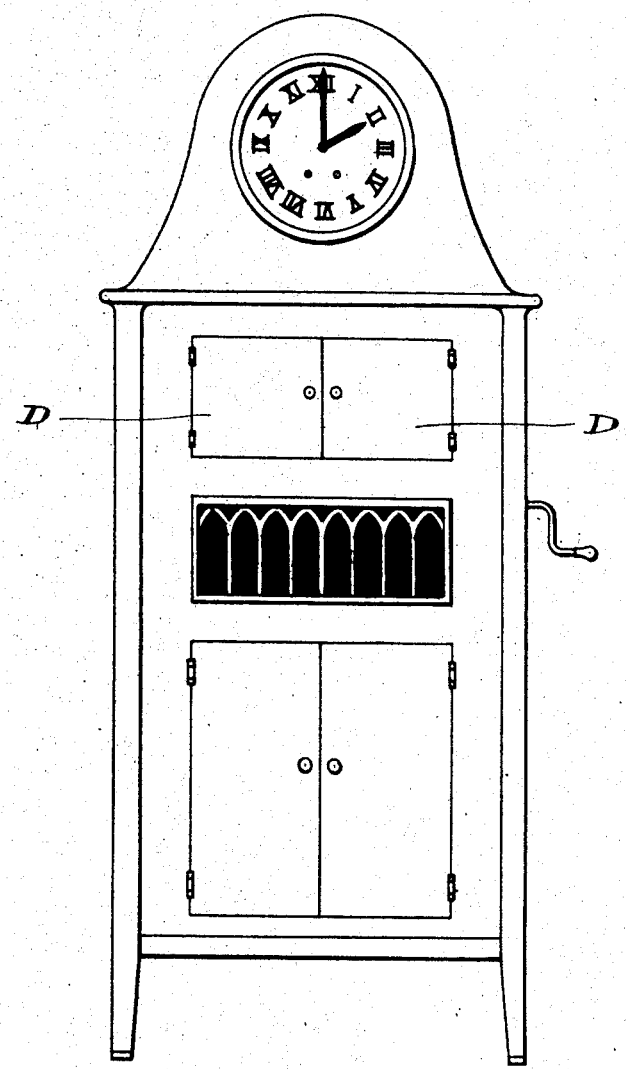

Fig. 14, is a front elevation of the phonograph cabinet with the clock super-posed thereon, the same being the design utilized where the mechanical connection illustrated in Fig. 13, is used.

Figure 15:
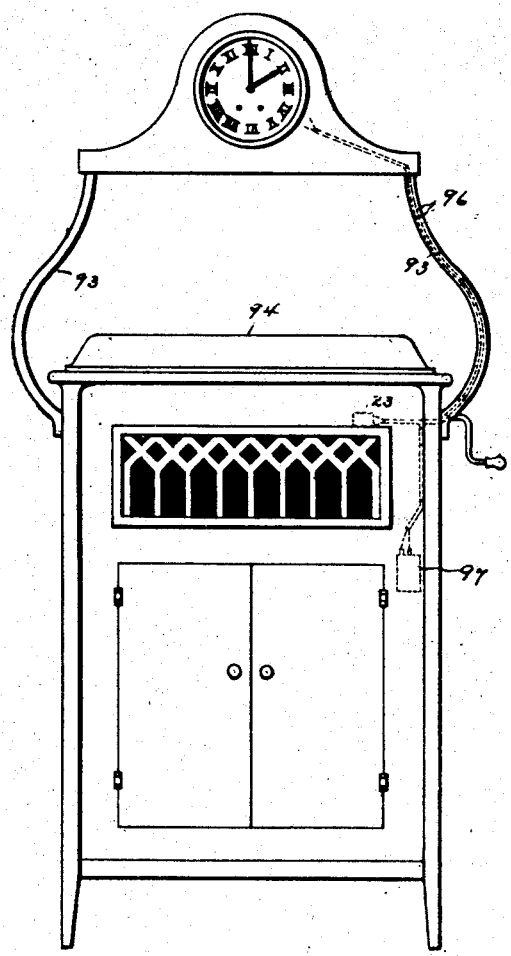

Fig. 15, is a view similar to Fig. 14, but illustrating a different form to be utilized where the electrical tripping off connection is used.

Figure 16:
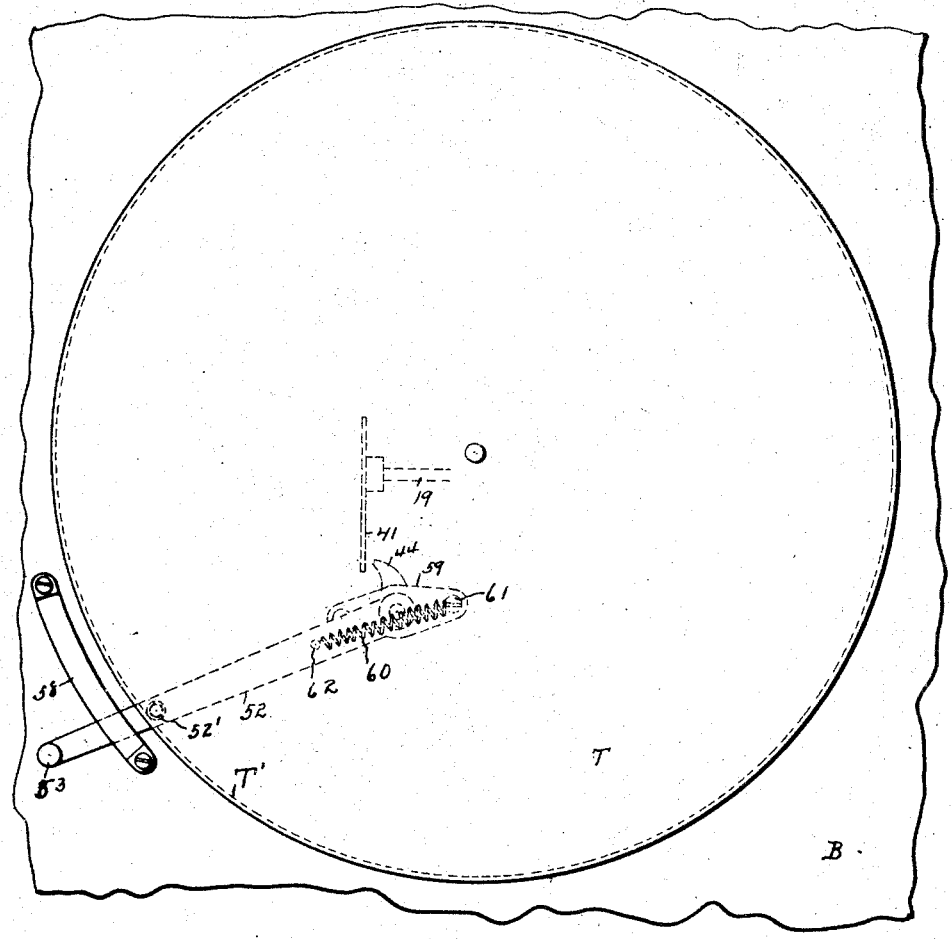

Fig. 16, illustrates in plan a phonograph turntable with the one form stop brake, showing the tripping off mechanism connection to the timing wheel.

Figure 17:
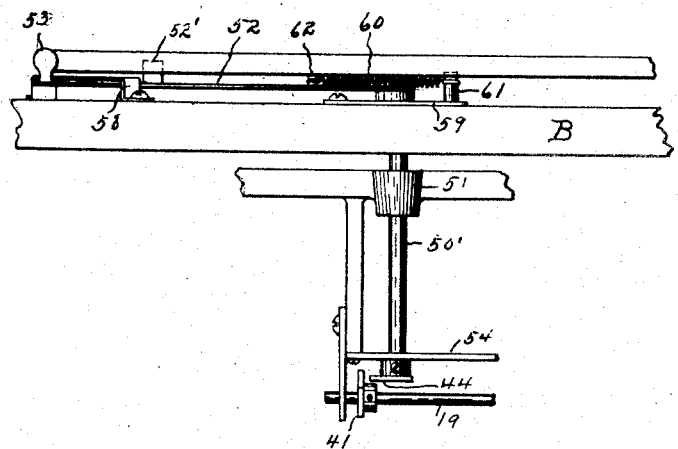

Fig. 17, illustrates a side elevation of the structure shown in Fig. 16.

Figure 18:
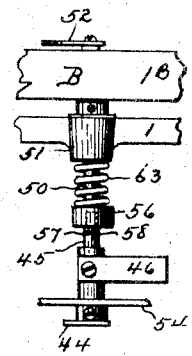

Fig. 18, is a modified view of a modified form of the structure illustrated in Fig. 17.

Fig. 19, is a chart illustrating the number of turns required to announce the time at any specified hour; the number of turns required for the turntable to pick up the requisite speed from a stand still; the number of turns required to break the connections and bring the turntable to a standstill; the number of seconds required for "pick up" time announcing and stopping the record for any particular hour; also the number of turns required for shifting the arm from final to initial position, together with a summary of the total number of turns required and the aggregate of the number of seconds consumed in announcing the various hours through a period of twelve hours.

Figure 20:
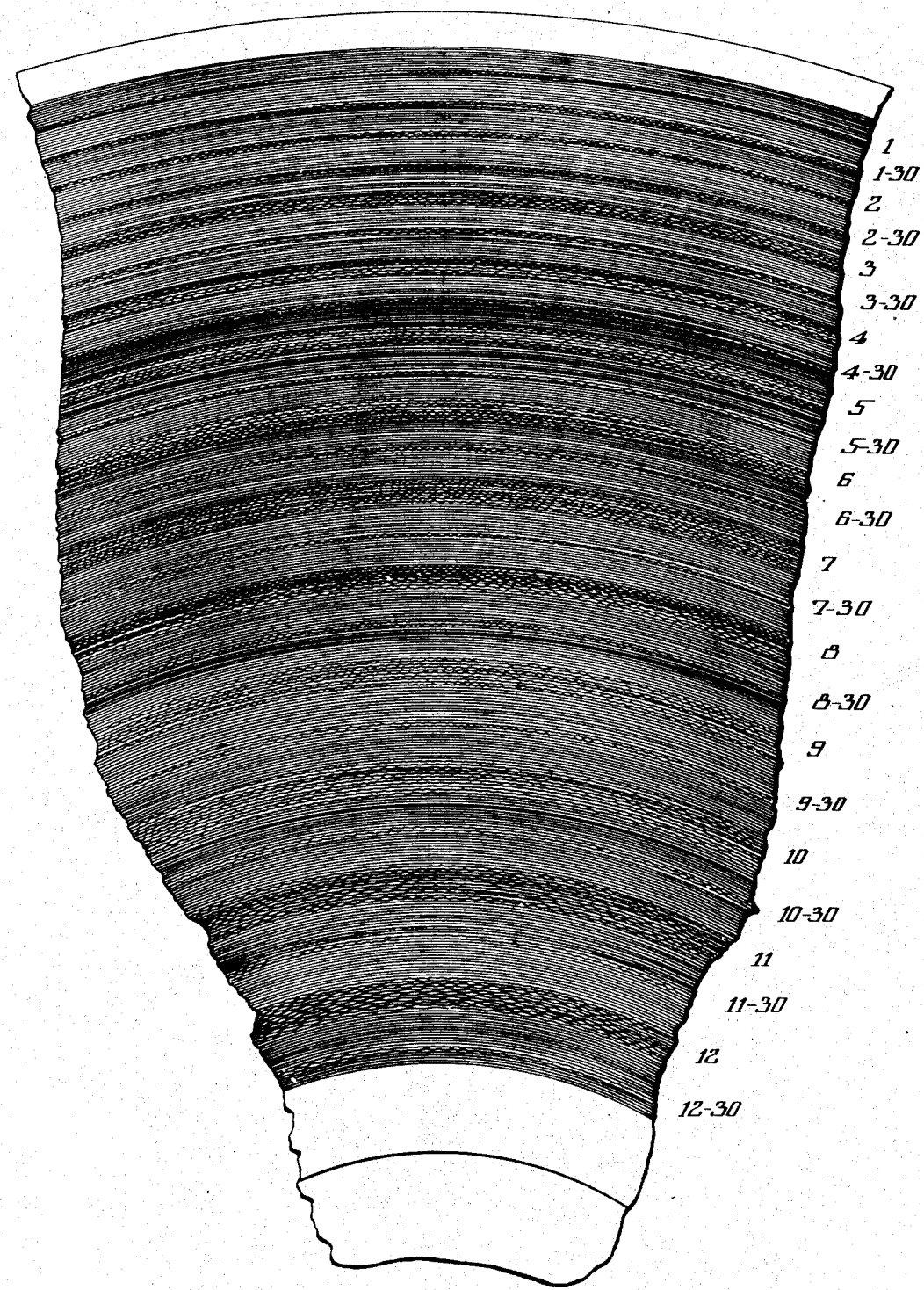

Fig. 20, illustrates an enlarged fragmentary portion of a phonograph record with the relative locations of the several time announcing grooves and the relative spaces occupied by the same across the face of the record.

Fig. 21, is a plan of the resetting dial and index.

Fig. 22, is a vertical section through the time wheel and its shaft, showing the resetting mechanism.

Fig. 23, is an enlarged view of the slidable clutch member on the worm shaft.

Fig. 24, is an end view of said clutch member.

Fig. 25, is an end view of the drive pinion showing the clutch points inserted therein.

Fig. 26, is a plan view of the resetting gauge to be placed upon the record disc for accurately resetting the sound box needle in its proper location with the time announcing sound record to correspond with the clock time.

Similar reference numerals refer to like parts throughout the specification and drawings.

As above indicated, the motor is of a well known type now extensively used as a driving mechanism for talking machines. It consists of the frame 1, in which the spring barrels 2, are mounted for driving the gear train consisting of the spur gears 3, 4, and 5, with an intermediate gear shaft 6, having thereon a spur gear 6', and a mitre gear 6², for communicating the rotation of the gear 3, and the gear 4, through the companion mitre gear 6³. (See Fig. 3.) The gear 5, is mounted upon the record spindle shaft 7, which shaft also carries the worm gear 8, the latter meshing with the worm on the governor spindle 9. This governor spindle carries the usual ball governor 10, consisting of the weights 11, mounted upon the springs 12, which in turn are carried by the collars 13, and 14. The collar 14, has the usual sliding friction or governor disc 15, by which the speed of the motor is regulated. These parts, as thus far described, are well known in the art.

Upon the frame 1, I mount the two brackets 16, and 17, securing the same in place by means of the screws 18. In these two brackets 16 and 17, I mount the rod 19, said rod being designed to have a slight longitudinal reciprocation against a compression spring 20, mounted upon said rod between the collar 21, and the bracket 16. The outer end of the rod 19, is connected to the core 22, of a solenoid 23, the latter being supported by the posts 24—24, upon the bracket 16. When said solenoid is energized the core 22, is drawn into said solenoid carrying with it the rod 19, against the compression of the spring 20. Mounted also in the brackets 16, and 17, is the worm shaft 25. It will be noted that this shaft has pivot bearings 27—28, the distance between the shoulders of which is slightly less than the distance between the two brackets 16, and 17, so that said worm shaft 25, may have a slight longitudinal reciprocation, the purpose of which will be hereafter clearly pointed out. Upon the shaft 25, is loosely mounted a spur pinion 29, in position to mesh with the main driving gear 3. This spur pinion 29, is provided upon one face with a pair of clutch studs 30, for the purpose of engaging with the radial grooves 31', in the sliding spring pressed clutch member 31, splined upon the shaft 25. The studs 30, and the grooved end of the spring pressed sleeve 31, serve as a clutch mechanism by which when said studs and sleeve are in engagement the shaft 25, may be rotated by the spur pinion 29. At all other times the pinion 29, revolves loosely upon the shaft 25. The shaft 25, is also provided with a worm 32, for engagement with a worm wheel 33, the latter being mounted upon the shaft 34, carried by the motor frame 1. Also mounted upon said shaft 34, is a divided time wheel 35, the periphery of said wheel being accurately spaced into what I term time spaced notches 36. The reciprocating rod 19, is provided with a lateral arm 37, having a hook 38, at its outer end in position to engage said respective notches 36, or to ride upon the convex periphery of the wheel 35, between said notches.

The shaft 34, extends through the top plate of the frame 1, and through the motor board B, and is provided at its upper end with an index hand 39, which sweeps over a dial 40, mounted upon the upper side of the motor board. This index and dial serve to indicate the proper setting of the timing mechanism when it is desired to arrange the device for announcing time.

The rod 19, carries at its opposite end a rigidly connected bar 41, said bar projecting laterally and having a forked end as 43, to engage a grooved collar upon the pinion 29, so that as the rod 19, is reciprocated the pinion 29, is carried with it to engage with, or disengage from the clutch sleeve 31. The opposite end of the bar 41, projects laterally into the path of the arm 44, the latter being mounted upon the sectional brake shaft 45, which latter carries the brake spring and shoe 46, for engaging the periphery of the governor disc 15.

From the structure thus far described, it will be seen that upon the reciprocation of the rod 19, the following mechanical operations are accomplished. First, the arm 37, with its hook 38, is withdrawn from a notch in the time wheel 35. Simultaneously the pinion 29, is moved along the shaft 25, with its clutch point 30, into engagement with the radial grooves 31', of the sliding clutch member 31, thereby compressing the spring 47. Simultaneously the arm 41, engages the brake arm 44, upon the shaft 45, and thereby lifts the brake shoe 46, from the periphery of the governor disc 15. When the hook 38, is released from one of the notches 36, of the wheel 35, said wheel may be permitted to rotate. The slight reciprocation of the shaft 25, due to the compression of the spring 47, gives the worm 32, a slight rack movement in connection with the worm wheel 33, to the extent of the longitudinal movement of the shaft 25. This carries the timing wheel 35, slightly forward in the direction of the arrow, so that if for any reason the solenoid 23, becomes de-energized, and the spring 20, tends to restore the parts, the hook 38, will engage the convex periphery of the wheel 35, and thus prevent the full return reciprocation of the rod 19, with the consequent return of all of the parts to their initial position. The release of the brake shoe 46, from the periphery of the governor disc 15, will permit the motor to operate and thus set all of the parts in motion, but as the main driving gear 3, rotates, it communicates its motion to the pinion 29, which being engaged with the clutch member 31, will cause the worm shaft 25, to rotate, and through the worm wheel 33, cause the timing wheel 35, also to rotate, but with the hook 38, riding upon the periphery between adjacent notches 36. When such convex surface is traversed by the hook 38, and a notch is reached, the spring 20, will reciprocate the rod 19, and cause the hook 38, to enter the corresponding notch 36; simultaneously the bar 41, with its forked end 43, will carry the pinion 29, free from the clutch member 31, thereby releasing the worm shaft 25. This movement is also attended by a release of the brake arm 44, whereupon the spring 48, will serve to swing the shaft 45, and cause the brake shoe 46, to again engage the periphery of the governor disc 15, thereby stopping the motor.

It will be noted that the timing wheel disc 35, has the notches 36, variously spaced apart. This spacing is accurately done so that said disc may continue to rotate a sufficient length of time to permit the announcement of the various hours and half hours, by means of the phonograph record hereafter to be described. For example, it will be noted from Fig. 6. that the hook 38, is in a notch 36, between a long peripheral space, and a very short peripheral space. The next peripheral space is slightly longer and the spaces alternate around the periphery of the disc 35, that is, a short space and a longer space, followed by a short space, and then a slightly longer space. The purpose of this is to permit longer periods successively to elapse, so that the successive hours may be counted out. It is obvious that it takes a longer time to count "twelve" than it does to count "one," "two," "three" or "four," or any other number less than "twelve," hence the "twelve" space so marked is the longest actual timing space.

In order that the brake shoe 46, and the shaft 45, may be utilized for other ordinary purposes in stopping and starting the phonograph, I have provided the following mechanism.

Referring to Figs. 16 and 18, it will be noted that the brake shaft 50, extends vertically through the bearing 51, in the frame 1, and is provided upon the upper side of the motor board B, with a long arm 52, reaching beyond the circumference of the turntable T, the end of such arm being provided with a handle 53, by which the brake shaft is manipulated. This brake shaft 50, extends down to a point midway between the frame 1, and the bottom frame plate 54, and is stepped into the stub shaft 45, at its lower end, which bears in and extends below the frame plate 54, and has rigidly connected thereon the arm 44, the pointed end of which is in position to engage the bar 41, upon the reciprocating rod 19, as above described. Upon the brake shaft 50, is rigidly secured the collar 56. The shaft 45 is provided with a lateral stud 57, in position to engage a corresponding stud 58, upon the lower face of the collar 56, as clearly shown in Fig. 18. From this construction it will be noted that the arm 52, may be swung around to oscillate the shaft 50, and during such oscillation the studs 57, and 58, will engage each other and thus oscillate the brake shoe 46, into and out of contact with the brake disc 15, upon the governor shaft and still the shaft 45, will be free to move around the lower end of the brake shaft 50, under the influence of the element 41, contacting with the arm 44. The spring 48, above referred to, serves to hold the brake shoe 46, in contact with the periphery of the governor disc 15. The free end of the arm 52, is provided with a keeper 58, to limit the swing of said arm 52. The upper end of the shaft 50, extends through a bearing plate 59, secured upon the upper face of the motor board B. The spring 60, is connected to a post 61, upon the plate 59, with the other end of said spring connected to a stud 62, upon the arm 52, so that as the arm 52, swings between its limits, the spring 60, will swing across the centre of rotation and thus maintain the brake arm 52, in either of its extreme positions. This, however, is a common construction and forms no part of my present invention. In order to afford frictional resistance for the movement of the arm 52, the spring 63, is mounted upon the shaft 50, between the lower end of the bearing 51, and the collar 56. From this construction it will be noted that the brake shoe 46, may be manipulated by the hand operated brake arm 52, or it may be operated by the reciprocation of the rod 19.

In Fig. 17, I have illustrated a slight modification of this brake arrangement, while Fig. 16, serves to illustrate the structures of both modifications. In this case the brake shaft 50', extends from the top of the motor board B, down through the bottom frame plate 54, and has the arm 44, rigidly secured upon its projecting end as shown, for engagement with the element 41, upon the rod 19. The brake lever 52, has a rubber covered shoe 52', secured thereto in position to engage the inner side of the turntable flange T'. The reciprocation of the rod 19, and the accompanying movement of the element 41, will cause a slight rotation of the brake shaft 50', sufficient to carry the shoe 52', free from the turntable flange, where it will be held during a time announcement. This movement, however, is insufficient to carry the lever 52, beyond a point where the spring 60, will pass across the center of the shaft 50', so that when the rod 19, is restored, and pressure is relieved from the arm 44, the spring 60, will cause the lever 52, to carry the shoe 52', again in contact with the turntable flange to stop the motor.

The motor illustrated in Figs. 1 and 2, is of a type designed to play six standard 12 inch records upon a single winding. It is therefore desirable when setting the device for announcing the time, that mechanism be provided for operating the tone arm 64, to swing it from the inner record convolution back to the beginning of the record, for the purpose of making the device continuously operative during a period of more than twelve hours, for it will be obvious from a description of the record to be used for time announcing, that a single sweep of the tone arm across the playing face of the record will occupy a period of twelve hours, so that at the end of the twelve hour period, when the tone arm shall have completed its traverse of the record space, it may be picked up and swung back to the initial position again, ready to start back automatically over the face of the record. In order to carry out this particular feature I have provided the following mechanism. Referring to Fig. 3, which is a detail including the spur gear 4, of the main driving train of the motor, it will be noted that the shaft 65, is mounted in the lower plate 54, and extends through the bearing 66, in the frame 1. The upper end of this shaft 65, is slotted as at 67. Mounted upon the projecting end of this shaft is a sleeve 68, having a cross pin 69, therein, engaging the slot 67. The lower end of this sleeve is provided with a pinion 70. The upper end of the sleeve 68, is provided with a groove 71, into which the forked end of the arm 72, extends. The arm 72, is rigidly connected to the upper end of a sliding rod 73, which extends through the frame 1, and through the bottom plate 54, with its lower end in position to ride upon the upper face of the time wheel, or disc, 35. Referring to Figs. 1 and 6, it will be noted that the disc 35, is provided with a slot 74, said slot lying in a position to permit the reciprocating rod 73, to enter therein when the disc 35, sweeps around in its revolution. When the slot 74, comes to the lower end of the reciprocating rod 73, said rod drops into said slot under the influence of the spring 75, mounted upon said rod between the collar 76, and the frame 1. As the disc 35, moves forward in the direction of the arrow in Fig. 3, the inclined edge 77, of said slot will act as a cam and thus elevate the rod 73, carrying with it the sleeve 68, and its pinion 70. The purpose of the structure just described, is to shift the pinion 70, into and out of engagement with the idle gear 78, in order to set in motion or stop the train of gears 78, 79 and 80. These latter gears are mounted upon the plate 81, as shown in Fig. 8, with the last gear 80, of the train, located beyond the circumference of the turntable T. At the outer end of the plate 81, I rigidly secure a sleeve bearing 82, which carries the sleeve bearing 83, upon which the gear 80, is rigidly secured. Within the sleeve 82, is a stub shaft 84, having a lateral pin 85, thereon, said pin projecting into a slot 86, in the sleeve 83. The upper end of the sleeve bearing 82, is provided with a cam surface or edge which is shown rectified in Fig. 9, as 87. From this structure it will be noted that as the gear 80, and the sleeve 83, rotate, the stub shaft 84, will rotate with it because of the rotation of the pin 85, in the vertical slot 86; but said pin 85, will also ride upon the cam surface 87, of the sleeve bearing 82, with the result that said stub shaft 84, not only has a motion of rotation, but a rising and falling motion.

The tone arm 64, is provided with a laterally extending plate 88, having the contour as illustrated in Fig. 7; said plate extends out over the upper end of the stub shaft 84, which is provided with a ball bearing 89, to reduce friction between said parts. The plate 88, is provided with a downwardly bent adjustable arm 90, which is in radial alignment with the center of rotation of the tone arm 64. The upper end of the stub shaft 84, is provided with a lateral arm 91, at the outer extremity of which is a pin 92, in position to sweep against the arm 90.

The operation of the device is as follows: Let it be assumed that the pinion 70, has been thrown in mesh with the gear 78, by the dropping of the rod 73, into the slot 74. Since the shaft 65, is one of the motor shafts and in motion at the time, the rotation of the shaft 65, will be communicated to the train of gears 78, 79 and 80. The rotation of the gear 80, will cause a simultaneous rotation of the stub shaft 84, but as the pin 85, sweeps around out of the cam 87, and rides upon the upper end of the sleeve 84, it will cause the elevation of the stub shaft 84, and with it the entire tone arm 64, and with it the sound box, clear of the record. As the shaft 84, rotates, the stud 92, will come in contact with the downwardly bent adjustable arm 90, and cause the entire tone arm to be swung back to its initial position, at which time the pin 85, will have reached the lowermost part of the cam surface 87, thereby dropping the tone arm to its normal position with the sound box resting upon the record. Inasmuch as it requires twelve hours for the complete revolution of the disc 35, it is obvious that this re-shifting of the tone arm 64, to initial position, will take place once in each twelve hours. I make the arm 90, adjustable upon the plate 88, so that the instant of contact with the pin 92, may be timed to take place as soon as the last record convolution has been completed by the sound box needle.

The mechanism for tripping off the rod 19, will now be described. As above set forth, the rod 19, is reciprocated by means of the core 22, of the solenoid 23, and when it is tripped off the mechanism heretofore described will be set in operation.

Referring now to Figs. 10, 11, 12, and 15; in Fig. 15, I have shown a phonograph cabinet with a frame work consisting of the brackets 93—93, extending up above the cabinet cover 94. Upon the upper ends of the brackets 93—93, I mount a clock case 95, entirely out of reach of the cabinet cover 94, when the latter is swung upwardly to replace records. Leading from the clock case down through one of the brackets 93, are the circuit wires 96, leading to and connected with the solenoid 23. The battery 97, for supplying current may be located anywhere conveniently within the cabinet.

Referring now to Figs. 10, and 11, for the make and break mechanism, by which the circuit to the solenoid 23, is closed and opened. it will be noted that these figures illustrate so much of the clock movement as is necessary to gain a full understanding of the operation of the mechanism. The striking train is shown as mounted between the frame plates 98, of the clock, in the usual manner. However, I have displaced the usual striking arm of the clock and substituted therefor, upon the outer end of the shaft 99, a disc 100, which has in its periphery a series of four notches 101. Also upon this shaft I have mounted another disc 102, which has four narrow notches 103, therein for engagement with the usual trip bar 104, of the clock movement. Upon the rear frame plate 98, I have mounted the two pieces of insulating material 105, and 106. Upon the insulation 105, I mount a spring contact member 107, having its lower end extending down to the rear side of the notched disc 100, and bearing in frictional contact therewith, as clearly shown in Fig. 11. Upon the insulation 106, I pivot the arm 108, said arm having a lateral projection 109, extending up into position to engage the periphery of the disc 100, and also to engage a pin 110, projecting from the face of the insulation 106, so as to limit the movement of said arm 108, under the influence of its spring 111. The striking mechanism of the clock is so well known that it is deemed unnecessary to fully explain the same. The two contact arms 107 and 108, it will be noted, in the position shown in Fig. 10, are electrically insulated from each other, inasmuch as the upper end of the arm 108, does not contact with the periphery of the disc 100. When, however, the hour or half hour is registered by the clock, the striking mechanism is tripped off in the usual manner. As it is tripped off the end of the arm 104, is lifted out of the notch 103, and the striking train is set in motion under the influence of the striking spring 112. As the disc 100, sweeps around, its periphery will come in contact with the upper end of the projection 109, thus establishing electrical connection between the arm 108, and the arm 107, through the disc 100. Referring now to Fig. 12, the disc 100, is diagrammatically shown as in electrical connection with the solenoid 23, the circuit being completed through the battery 97, back to the arm 108. From the construction as described, it will be understood that the disc 100, is governed by the clock time train, that it is tripped off upon the hour and upon the half hour, and when so tripped off the electrical connections just described are completed, with the result that the core 22, is drawn into the solenoid 23, thereby shifting the rod 19, longitudinally; this movement is attended, as heretofore described, with the lifting of the brake shoe 46, and the shifting of the pinion 29, with its studs 30, into engagement with the clutch member 31, thereby rotating the disc 35, through the worm 32, and worm wheel 33. The shifting of the rod 19, is also attended by the release of the hook 38, upon the end of the arm 37, from engagement with one of the notches 36, of the disc 35, thus the entire mechanism is released to permit the motor to run, and it will so continue to run until the hook 38, engages the next notch, for it must be understood that the rod 19, remains in its shifted position so long as the hook 38, rides upon the periphery of the disc 35. When a notch is reached the hook 38, will snap into such notch, by reason of the expansion of the spring 20. Simultaneously the brake shoe 46, will be released to come in contact with the governor disc 15, thereby stopping the motor.

The record to be used in connection with the time announcing mechanism is illustrated in an enlarged scale in Fig. 20, which shows a fragment of the record disc with the various record grooves delineated thereon. For example: It will be noted near the periphery that there are several blank grooves, followed by an undulating record groove which is marked "1", this is next followed by a series of blank grooves after which appear a series of laterally undulating grooves representing "1:30", next comes "2", "2:30", and so on up to "12" and "12:30", when the entire record surface of the record will be filled. In the development of the record illustrated in Fig. 20, it is found that the time occupied in counting the various numbers from "one" to "twelve", will occupy varying spaces upon the surface of a sound record; for example, to sound the word "one" requires slightly less than two speech turns of the record. To pronounce "one thirty" requires slightly more than two speech turns; to pronounce "one, two" requires about three speech turns,—thus the scale is carried out as illustrated in Fig. 19, up to the number "twelve", which to count requires about twelve full speech turns of the record. The aggregate of the number of speech turns thus amounts to one hundred and sixteen. It must be remembered that in sounding the hours and half hours from the phonograph record, the phonograph motor must start from a standstill and acquire the requisite speed before the time announcing begins; otherwise the tone will be materially distorted and out of pitch. After a long series of tests I have found that at the beginning it requires about five full turns of the turntable before the motor has picked up the requisite speed, and owing to the inertia of the rotating turntable it requires about five turns to bring the motor to a stop from full speed. These "pick-up turns" and "break turns" vary slightly from the beginning and increase as the sound box approaches the center of the record. A careful series of tests has led me to adopt the number of turns following each time announcement as illustrated in the chart shown in Fig. 19, where it will be shown that the aggregate of the "pick-up turns" amounts to one hundred and thirty-one, and the aggregate number of "break turns" amounts to one hundred and thirty-one.

Now at the end of the record, or after the time "twelve thirty" has been announced by the record, the tone arm must be shifted back to initial position. By careful tests it is found that during this shifting movement, twenty-two turns of the turntable will take place, thus we have the aggregate of about four hundred turns of the turntable during a period of twelve hours, and the aggregate of the times occupied by the various time announcements is about three hundred seconds, or five minutes. The spacing of the notches in the periphery of the disc 35, is based upon the number of record turns as illustrated in the chart shown in Fig. 19.

The addition of my improvement to the ordinary phonograph motor does not interfere in the slightest manner with the operation of the phonograph for the reproduction of any other sound record. For example: It is only necessary to remove the time announcing record illustrated in Fig. 20, from the turntable and to substitute another sound record in its place. The starting and stopping of the motor is accomplished in the usual manner by means of the brake arm 52. When, however, it is desired to restore the phonograph to its time announcing functions, the time announcing record of Fig. 20, is replaced upon the machine and the motor is started and run freely until such time as the index hand 39, points to the same hour as is registered by the clock 95, when the motor may be stopped by swinging the arm 52, to the "stop" position and the motor left to itself. At the proper times the contacts between the arm 108, and the disc 100, will take place, whereupon the motor will be started, the turntable revolved about five revolutions to acquire normal speed, when of course, the sound box needle will have reached the time announcing record groove and the time will be announced. This will be followed by the hook 38, engaging one of the notches 36, and the mechanism will be stopped until tripped off at the next half hour by the clock mechanism just described. This continues until, as heretofore set forth, the end of the record is reached, at which time the rod 73, will be snapped over into the slot 74, thereby bringing into operation the tone arm shifting gear train 78, 79 and 80, to shift the tone arm and its sound box to its initial position.

The mechanism is completely automatic and requires no attention when set except to see that the clock and the motor are both wound up.

When a clock is striking within a person's hearing distance, it so frequently happens that the hearer fails to catch the first two or three strokes, with the result that while he can hear the clock striking, yet having failed to hear the first two or three strokes, he does not know when the striking ceases, the exact time without inspecting the face of the clock. It is obvious that if the time is announced by actual counting in words what would ordinarily be strokes upon the clock bell, that it is immaterial whether the clock be in the view of the hearer or not. He will hear the time announced in words, as for example,—"one", "one thirty", "one, two", "two thirty", "one, two, three", "three thirty", and so on throughout the twelve hours.

While I have shown the preferred form of my improvement as operated through the means of electrical connections between the clock and the phonograph motor, yet it is obvious that a purely mechanical connection can be made between the clock and the motor, as illustrated in Fig. 13. It will be remembered that the rod 19, is the actual tripping off rod which sets the phonograph in motion. In Fig. 13, I have shown the corresponding rod 19', as extended out toward the side of the cabinet, into contact with the upright arm 120, of a small bell crank 121, pivotally mounted upon the inner side of the phonograph cabinet. The other arm 122, is connected by means of the rod 123, to a lever 124, pivoted adjacent to the clock movement in the hood of the phonograph cabinet. The other arm of the lever is provided with a laterally projecting pin 125, which extends into engagement with the lobes of a cam disc 126, the latter being operated in identically the same manner and by the same mechainsm as the disc 100, illustrated in Figs. 10, and 11. When said disc 126, is rotated, it is obvious that the lever 124, will be oscillated. This motion will be communicated through the bell crank 121, to the reciprocating rod 19'. The normal positions of rest in the two discs 100 and 126, are as shown in Figs. 10, and 13. In either case, all that these discs are required to do is to communicate a slight impulse to the rod 19, or 19', just sufficient to trip off the operative mechanism of the phonograph motor. The mechanical connection between the clock and motor as just described cannot be mounted upon cabinets where the lid is elevated to replace records without complicating the structure; for that reason, I prefer to mount the clock directly upon the top of the cabinet, as shown in Fig. 14, and provide for replacing the records through the doors D, so that the clock may not disturbed. As an attachment, however, to existing forms of cabinets, where the replacement of records is made by lifting a lid, as shown in Fig. 15, the electrical connection between the clock and motor is preferable and the form of support as shown in said Fig. 15 will place the clock in a position where replacement of records will not disturb it.

In order to afford a quick means for resetting the time wheel 35, and the sound box needle at the proper point upon the special time announcing record shown in Fig. 20, I provide the following means: In Fig. 22, I have shown the shaft 34, as extending above the motor board B, for some distance, with the hub 34', at its upper end, carrying the index hand, or pointer, 39', in position to sweep around the raised dial 40'. The time wheel 35, and worm wheel 33, are mounted upon the lower end of the shaft and are operated as heretofore described. Above the bottom frame plate 54, the spring 130, surrounds the shaft 34, and bears upon the under face of the collar 131, to support the parts in the position shown. It is obvious that so long as the hook 38', engages a notch 36, in the time wheel 35, and the worm wheel 33, engages the worm 32, the shaft 34, cannot be independently rotated. However, by depressing the shaft 34, against the spring 130, the parts are shifted out of their respective engagements, and then the shaft may be freely rotated to bring the pointer 39', to register with a number upon the dial corresponding to the hour indicated by the clock; upon releasing the pressure upon the shaft 34, the spring 130, will restore all of the parts to their respective engagements, and ready for their time announcing functions. In this case it will be noticed that the hook 38', upon the arm 37', is reversed and that clearance is afforded for the periphery of the wheel 35, to swing around without interference.

It now remains to set the tone arm and sound box in proper position to correctly announce the time, and in order to do this quickly and conveniently, I provide a detachable gauge 135, (Fig. 26), to be placed upon the time announcing record with its hub 136, upon the turntable spindle. The arc shaped edge of the gauge is provided with a series of notches 137, spaced apart and marked to correspond with the time announcing record grooves as shown in Fig. 20. The time is noted from the clock, and the sound box needle is set upon the record at the point indicated upon the gauge as the hour or half hour corresponding to the approaching hour or half hour as shown by the clock: For example:—Suppose the clock time is noted as 6:10; the sound box needle is set in the notch marked 6:30. The gauge is then swung away and removed, and at 6:30, the motor will be set in operation with the assurance that "six thirty" will be announced when that time shall have arrived; and when once in this manner, all the succeeding hours and half hours will be regularly announced, the only attention thereafter required being to keep the clock and motor wound.

In some cases it may add to the novelty of the time announcement, to have the same preceded, accompanied, or followed by a bar of music, or some quotation. These additions can be impressed upon the record at the time it is made.

From the foregoing it will be seen that my improvement enables me to adapt the ordinary phonograph to a much wider range of usefulness, while the additions to the well known forms of the instrument are comparatively simple both in construction and in manipulation.

I claim:

1. In a time announcing phonograph, the combination of a time clock and a phonograph motor including its governor and brake shoe, means connecting said clock with said brake shoe for releasing the same to start said motor at half hourly intervals as indicated by said clock, said means including an automatic device for re-setting said governor brake shoe to stop said motor after predetermined varied lapses of time dependent upon the time required to make the respective time announcements.

2. In a time announcing phonograph, the combination of a time clock and a motor including its governor and brake, electrical means connecting said clock and said motor for releasing the brake at predetermined differing time intervals, and automatic means connected with said motor for resetting said brake after predetermined differing lapses of time said lapses depending respectively upon the time required to make the separate time announcements.

3. In a time announcing phonograph, the combination of a motor including its governor and governor brake, a timing wheel driven by said motor, means actuated by said timing wheel for resetting said governor brake after predetermined differing lapses of time depending upon the time consumed in making the separate respective time announcements, to stop said motor.

4. In a time announcing phonograph, the combination of a spring driven motor gear train, a timing wheel having its periphery divided into a series of notches at varying distances apart and spaced to correspond to the time lapses required to announce the time, gear connections between said motor gear train and said timing wheel for rotating said timing wheel, stop mechanism comprising a governor and its brake for said motor, and means cooperating with said notches for actuating said brake to stop said motor gear train after predetermined lapses of time as indicated by said spaces upon the timing wheel.

5. In a time announcing phonograph, the combination of a spring driven motor gear train, a timing wheel having a series of spaced notches in its periphery, gear connections between said gear train and said timing wheel, a clutch in said connections connecting said timing wheel to the motor gear train, stop mechanism for said motor gear train, and means actuated at predetermined time intervals for simultaneously actuating said clutch mechanism to connect said timing wheel to said gear train and for releasing said stop mechanism to permit the driving of said gear train, said means cooperating with the notches of said timing wheel after predetermined lapses of time to release said clutch mechanism and said stop mechanism to simultaneously disconnect said timing wheel from said gear train and to stop said motor gear train.

6. In a time announcing phonograph, the combination of a spring driven motor gear train, and a timing wheel, connections for driving said wheel from said gear train comprising a reciprocating shaft having a worm thereon, a loose pinion also mounted upon said shaft in constant engagement with a gear in said train, a worm wheel rigidly connected to said timing wheel for engagement with said worm, and clutch mechanism for connecting said pinion to said shaft to cause the rotation of said timing wheel from said motor.

7. In a time announcing phonograph, the combination of a spring driven motor gear train, and a timing wheel, connections for driving said wheel from said gear train comprising a reciprocating shaft having a worm thereon, a loose pinion also mounted upon said shaft in constant engagement with a gear in said train, a worm wheel rigidly connected to said timing wheel for engagement with said worm, and time controlled clutch mechanism for connecting said pinion to said shaft to cause the rotation of said timing wheel from said motor.

8. In a time announcing phonograph, the combination of a spring driven motor gear train, and a timing wheel, connections for driving said wheel from said gear train comprising a reciprocating shaft having a worm thereon, a loose pinion also mounted upon said shaft in constant engagement with a gear in said train, a worm wheel rigidly connected to said timing wheel for engagement with said worm, and electrically actuated clutch mechanism for connecting said pinion to said shaft to cause the rotation of said timing wheel from said motor.

9. In a time announcing phonograph, the combination of a spring driven motor gear train, and a timing wheel, connections for driving said wheel from said gear train comprising a reciprocating shaft having a worm thereon, a loose pinion also mounted upon said shaft in constant engagement with a gear in said train, a worm wheel rigidly connected to said timing wheel for engagement with said worm, and time controlled electrically actuated clutch mechanism for connecting said pinion to said shaft to cause the rotation of said timing wheel from said motor 10. In a time announcing phonograph, the combination of a motor gear train, a timing wheel, means for rotating said timing wheel from said gear train, comprising a worm wheel rigidly connected to said timing wheel, a shaft having a worm thereon for engagement with said worm wheel, and clutch mechanism for connecting said shaft to said gear train, whereby said timing wheel may be driven by said gear train, and means controlled by said timing wheel to maintain such connection for predetermined times, and thereafter to release said clutch connection to disconnect said timing wheel from said gear train.

11. In a time announcing phonograph, the combination of a motor gear train, and a timing wheel, gear connections between said train and wheel for driving the latter from the former, and means for permitting said timing wheel to be shifted relative to said connections for adjusting its timing relation with respect to said gear train.

12. In a time announcing phonograph, the combination of a motor frame, and a gear train mounted therein, a supplemental shaft mounted in said frame, gear connections between said shaft and said train, a timing wheel mounted upon said shaft, means for permitting said shaft to be shifted in the direction of its length to separate said gear connections whereby said wheel may be rotated independently to adjust its timing relation to said motor gear train.

13. In a time announcing phonograph, the combination of a time clock having a time train and a time announcing train therein, means connecting said respective trains for causing the time train to trip off and set in motion said announcing train at half hourly periods, a phonograph motor and connections between said announcing train and said motor, comprising the regulating governor, its brake disk and brake shoe, and means actuated by said clock for releasing said shoe from said disk to start said motor and for resetting said shoe to stop said motor after predetermined differing time lapses which depend upon the time consumed in making the respective time announcements.

14. In a time announcing phonograph, the combination of a time clock having a time announcing train therein, means for operating said train at predetermined times, a phonograph motor, electrical connections between said announcing train and said motor for starting said motor as and when said announcing train is operated, and automatic timing mechanism actuated by said motor for stopping it after it has run predetermined varied lengths of time.

15. In a time announcing phonograph, the combination of a time clock, and a spring motor gear train, a record turntable driven by said gear train, means connecting said clock and gear train, for setting the latter in operation at each hour and half hour as indicated by said clock, and for stopping it after predetermined varied lapses of time dependent upon the time consumed in making the separate time announcements, a sound record carried by said turntable having the time announcements thereon to correspond with the time indications of said clock, and a sound box for reproducing said record time announcements.

16. In a time announcing phonograph, the combination of a sound record and a time clock, said record having impressed thereon the hour and half hour announcements of the time as indicated by said clock, a phonograph motor for driving said record, connections between said motor and clock for setting said motor in motion at each hour and half hour as indicated by said clock, automatic means governed by the predetermined but differing lapses of time consumed in making said time announcements for stoping said motor, and a sound box for reproducing said record time announcements as and when said motor is set in motion by said connections.

17. A time announcing sound record having its record surface made up of alternate series of blank convolutions and record convolutions, said record convolutions containing respectively the hourly and half hourly announcements of the time, as "one," "one thirty," "one two," "two thirty," etc.

18. A time announcing photograph record, having its record surface made up of alternate series of record convolutions and blank convolutions, said record convolutions containing respectively the consecutive hourly and half hourly time announcements from "one" to "twelve thirty," in combination with a clock controlled phonograph having means therein for automatically reproducing said sound record in consonance with the clock indicated time.

ANTHONY VASSELLI.